United States Patent [19]

Charbonneau et al.

[11] Patent Number: 4,746,694

[45] Date of Patent: May 24, 1988

[54] MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY, 4-OXYBENZOYL MOIETY, 2,6-DIOXYNAPHTHALENE MOIETY, AND TEREPHTHALOYL MOIETY

[75] Inventors: Larry F. Charbonneau, Chatham; Gordon W. Calundann, North Plainfield, both of N.J.; Brian C. Benicewicz, Santa Fe, N. Mex.

[73] Assignee: Hoechst Celanese Corporation, Bomerville, N.J.

[21] Appl. No.: 69,784

[22] Filed: Jul. 6, 1987

[51] Int. Cl.$^4$ .............................................. C08G 69/44
[52] U.S. Cl. .................................. 524/602; 528/176; 528/193; 528/194
[58] Field of Search ............... 524/604, 605; 528/176, 528/193, 194

[56] References Cited

U.S. PATENT DOCUMENTS

| | | | |
|---|---|---|---|
| 4,083,829 | 4/1978 | Calundann et al. | 528/171 X |
| 4,184,996 | 1/1980 | Calundann | 528/193 X |
| 4,272,625 | 6/1981 | McIntyre et al. | 528/183 |
| 4,355,132 | 10/1982 | East et al. | 524/602 |
| 4,412,058 | 10/1983 | Siemionko | 528/191 |
| 4,447,593 | 5/1984 | Funakoshi et al. | 528/176 |
| 4,499,259 | 2/1985 | Irwin | 528/190 |
| 4,564,669 | 1/1986 | Dicke et al. | 528/190 X |
| 4,614,789 | 9/1986 | Dicke et al. | 528/193 C X |

*Primary Examiner*—Lucille M. Phynes
*Attorney, Agent, or Firm*—Burns, Doane, Swecker & Matois

[57] ABSTRACT

The novel polyester of the present invention is capable of forming a highly tractable anisotropic melt phase. Such polyester includes a relatively low concentration of 6-oxy-2-naphthoyl moiety in combination with a more substantial concentration of 4-oxybenzoyl moiety. Other key moieties present are, 2,6-dioxynaphthalene moiety and terephthaloyl moiety. The polyester can be formed via a melt polymerization procedure to achieve a relatively high degree of polymerization in view of its relatively low melt viscosity. The polyester upon melt extrusion forms quality high performance fibers, films, and three-dimensional shaped articles. The resulting product also well retains desirable mechanical properties at elevated temperatures.

26 Claims, No Drawings

MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY, 4-OXYBENZOYL MOIETY, 2,6-DIOXYNAPHTHALENE MOIETY, AND TEREPHTHALOYL MOIETY

BACKGROUND OF THE INVENTION

Certain polymers which are capable of forming an anisotropic melt phase have been discussed in the technical literature in the past. These polymers sometimes are termed thermotropic liquid crystalline polymers.

Commonly assigned U.S. Pat. No. 4,184,996 to Calundann discloses an anisotropic melt-forming polyester consisting essentially of 4-oxybenzoyl units, 2,6-dioxynaphthalene units and terephthaloyl units in specified concentrations. 6-oxy-2-naphthoyl units are not included. The possible presence of dicarboxy and dioxy units is mentioned at Col. 4, lines 17 and 24. The resulting polymer has been found to exhibit a relatively high melt viscosity which has precluded the achievement of a relatively high degree of polymerization in the melt phase. Accordingly, it has been found essential to employ a subsequent solid state polymerization as indicated in Example II of that patent if one is to substantially increase the molecular weight of the product. Such relatively high melt viscosity also has rendered somewhat difficult the melt extrusion of filaments of relatively low denier, and the molding of shaped articles having complex configurations or relatively thin cross-sections.

Commonly assigned U.S. Pat. No. 4,219,461 to Calundann discloses an anisotropic melt-forming polyester consisting essentially of 6-oxy-2-naphthoyl units, 4-oxybenzoyl units, symmetrical dioxy aryl units, and symmetrical dicarboxy aryl units in specified concentrations. In all instances the relatively expensive 6-oxy-2-naphthoyl units are present in concentrations of 20 to 40 mole percent. The polyester of the present invention commonly exhibits higher as-spun fiber moduli, a better retention of properties at elevated temperatures (e.g., 200° C.), and a higher heat deflection temperature than the polyester of U.S. Pat. No. 4,219,461.

Our commonly assigned U.S. Pat. No. 4,473,682 discloses an anisotropic melt-forming polyester consisting essentially of 6-oxy-2-naphthoyl units, 4-oxybenzoyl units, 4,4'-dioxybiphenyl units, and terephthaloyl units. The polyester of the present invention commonly exhibits a higher heat deflection temperature, better mechanical properties, and the ability to be molded at lower temperatures than the polyester of U.S. Pat. No. 4,473,682.

U.S. Pat. No. 4,370,466 to Siemionko discloses an anisotropic melt-forming polyester consisting essentially of 6-oxy-2-naphthoyl units, 4-oxybenzoyl units, 1,4-dioxyphenylene units, and isophthaloyl units. The polyester of the present invention commonly exhibits better hydrolytic stability, and a better retention of properties at elevated temperatures (e.g., 200° C.) than the polyester of U.S. Pat. No. 4,370,466.

Commonly assigned U.S. Pat. No. 4,256,624 to Calundann discloses an anisotropic melt-forming polyester consisting essentially of 6-oxy-2-naphthoyl units, symmetrical dioxy aryl units, and symmetrical dicarboxy aryl units in specified concentrations. At Col. 6, lines 19 to 24, it is stated that 10 mole percent or less of 4-oxybenzoyl units optionally can be present. The polyester of the present invention commonly exhibits a higher heat deflection temperature, and can be formed on a more economical basis than the polyester of U.S. Pat. No. 4,256,624.

U.S. Pat. No. 4,188,476 to Irwin discloses an anisotropic melt-forming polyester consisting essentially of 4-oxybenzoyl units, 2,6-dioxynaphthalene units, terephthaloyl units, and isophthaloyl units or 3-oxybenzoyl units. The polyester of the present invention commonly exhibits higher as-spun fiber properties than the polyester of U.S. Pat. No. 4,188,476.

Commonly assigned U.S. Pat. No. 4,351,918 to Charbonneau et al discloses an anisotropic melt-forming polyester-amide which consists essentially of 6-oxy-2-naphthoyl units, 4-oxybenzoyl units, terephthaloyl units, and amide units. The polyester of the present invention commonly exhibits a higher heat deflection temperature and can be formed on a more economical basis than the polyester of U.S. Pat. No. 4,351,918.

It is an object of the present invention to provide an improved melt processable polyester which forms a readily tractable anisotropic melt phase which facilitates polymerization in the melt to a relatively high inherent viscosity in a satisfactory yield.

It is an object of the present invention to provide a novel melt processable polyester which forms an anisotropic melt phase and which has been found to be capable of melt extrusion to form quality high performance fibers, films, three-dimensional molded articles, etc. using standard equipment.

It is an object of the present invention to provide a novel polyester which forms a readily melt processable anisotropic melt phase below approximately 325° C.

It is an object of the present invention to provide a novel improved polyester which can be more readily melt processed than the polyester of U.S. Pat. No. 4,184,996.

It is another object of the present invention to provide a novel polyester which can be melt processed to form articles which exhibit a superior retention of mechanical properties when heated from room temperature to 200° C.

These and other objects, as well as the scope, nature and utilization of the invention will be apparent to those skilled in the art from the following detailed description and appended claims.

SUMMARY OF THE INVENTION

It has been found that an improved melt processable polyester capable of forming an anisotropic melt phase at a temperature below approximately 325° C. consists essentially of the recurring moieties I, II, III, and IV wherein:

I is

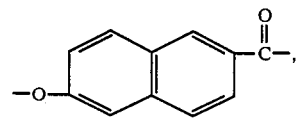

II is

III is

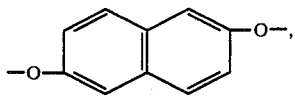

and
IV is

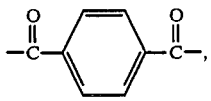

where the aromatic rings of the moieties illustrated optionally may include substitution of at least some of the hydrogen atoms hereon selected from the group consisting of an alkyl group of 1 to 4 carbon atoms, an alkoxy group of 1 to 4 carbon atoms, halogen, phenyl, and mixtures of the foregoing, and wherein the polyester comprises 3 to 10 mole percent of moiety I, 40 to 75 mole percent of moiety II, 7.5 to 27.5 mole percent of moiety III, and 7.5 to 27.5 mole percent of moiety IV.

DESCRIPTION OF PREFERRED EMBODIMENTS

The melt processable polyester of the present invention consists essentially of at least four recurring moieties which when combined in the polyester have been found to form an atypical highly tractable anisotropic melt phase at a temperature below approximately 325° C., and preferably below approximately 305° C. (e.g., below approximately 300° C. in a particularly preferred embodiment). The polymer melting temperature may be confirmed by the use of a differential scanning calorimeter (i.e., DSC) employing repeat scans at a 20° C. per minute heat-up rate and observing the peak of the DSC melt transition. The polyester of the present invention may be considered crystalline in the sense that fibers melt extruded therefrom exhibit X-ray diffraction patterns using Ni-filtered CuK$\alpha$ radiation and flat plate cameras characteristic of polymeric crystalline materials. Because of its ability also to exhibit anisotropic properties (i.e., liquid crystalline properties) in the melt, the polyester readily can form a product having a highly oriented molecular structure upon melt processing. Preferred polyesters are capable of undergoing melt processing at a temperature in the range of approximately 300° to 370° C. (e.g., at approximately 305° to 360° C.). The usual difficulties incurred when one attempts to melt process many aromatic polyesters by conventional melt processing techniques effectively are eliminated.

The first essential unit (i.e., moiety I) of the polyester of the present invention is a 6-oxy-2-naphthoyl moiety of the structural formula:

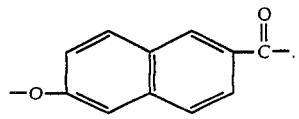

Such moiety is present in a relatively low concentration as discussed hereafter, and the aromatic rings thereof optionally may include substitution of at least some of the hydrogen atoms present thereon with groups such as an alkyl group of 1 to 4 carbon atoms, an alkoxy group of 1 to 4 carbon atoms, halogen, phenyl, and mixtures of these. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, etc. In a preferred embodiment moiety I is free of ring substitution and is derived from 6-hydroxy-2-naphthoic acid or its ester-forming derivatives.

As will be apparent to those skilled in the art, moiety I can be derived from unsubstituted 6-hydroxy-2-naphthoic acid or the ester-forming derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol. Additionally, see U.S. Pat. No. 4,287,357.

Moiety I comprises approximately 3 to 10 mole percent of the polyester. In a preferred embodiment moiety I is present in a concentration of approximately 5 to 10 mole percent (e.g., approximately 5 or 10 mole percent).

The presence of moiety I in the polyester of the present invention even in such low concentration has been found to significantly lower the melt viscosity of the resulting polymer and to render the polymer more readily melt processable thereby making possible the use of more conventional melt extrusion equipment and processing conditions than would otherwise be required. Moiety I while contributing to the properties of the resulting polyester does not contribute substantially to the overall cost for producing such polyester in view of its relatively low concentration.

The second essential moiety (i.e., moiety II) of the polyester of the present invention is a 4-oxybenzoyl moiety of the structural formula:

The aromatic rings thereof optionally may include substitution of at least some of the hydrogen atoms present thereon with groups such as an alkyl group of 1 to 4 carbon atoms, an alkoxy group of 1 to 4 carbon atoms, halogen, phenyl, and mixtures of these. Representative ring substituted compounds from which moiety II can be derived include: 3-chloro-4-hydroxy benzoic acid, 2-chloro-4-hydroxybenzoic acid, 2,3-dichloro-4-hydroxy-benzoic acid, 3,5-dichloro-4-hydroxybenzoic acid, 2,5-dichloro-4-hydroxybenzoic acid, 3-bromo-4- hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, etc. In a preferred embodiment moiety II is free of ring substitution and is derived from 4-hydroxybenzoic acid or its ester-forming derivatives.

Moiety II is present in a substantial concentration and can be derived from unsubstituted p-hydroxybenzoic acid or its ester-forming derivatives. Moiety II is present in a concentration of 40 to 75 mole percent. In a preferred embodiment moiety II is present in a concentration of approximately 45 to 70 mole percent (e.g., 67.5 to 70 mole percent).

The third essential moiety (i.e., moiety III) of the polyester of the present invention is a 2,6-dioxynaphthalene moiety of the formula:

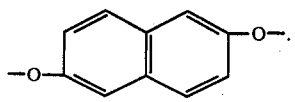

The aromatic rings thereof optionally may include substitution of at least some of the hydrogen atoms present thereon with groups such as an alkyl group of 1 to 4 carbon atoms, an alkoxy group of 1 to 4 carbon atoms, halogen, phenyl, and mixtures of these. Representative ring substituted compounds from which moiety III can be derived include: 1-chloro-2,6-dihydroxynaphthalene, 1-phenyl-2,6-dihydroxynaphthalene, 1-methyl-2,6-dihydroxynaphthalene, 4-methoxy-2,6-dihydroxynaphthalene, 1,5-dimethyl-2,6-dihydroxynaphthalene, 1,5-diphenyl-2,6-dihydroxynaphthalene, etc. In a preferred embodiment moiety III is free of ring substitution and is derived from 2,6-dihydroxynaphthalene or its ester forming derivatives. 2,6-diacetoxynaphthalene is more stable and easier to store than 2,6-dihydroxynaphthalene.

Moiety III can be derived from unsubstituted 2,6-dihydroxynaphthalene or its ester-forming derivatives. Preferred routes for forming intermediates which can be converted to 2,6-dihydroxynaphthalene are disclosed in U.S. Pat. Nos. 4,503,262 and 4,593,125.

Moiety III is present in a concentration of 7.5 to 27.5 mole percent, and preferably in a concentration of 10 to 20 mole percent.

The fourth essential moiety (i.e., moiety IV) of the polyester of the present invention is a terephthaloyl moiety of the formula:

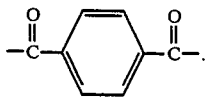

Moiety IV can be derived from terephthalic acid or its ester-forming derivatives.

Moiety IV optionally may include substitution of at least some of the hydrogen atoms present thereon with groups such as an alkyl group of 1 to 4 carbon atoms, an alkoxy group of 1 to 4 carbon atoms, halogen, phenyl, and mixtures of these. Representative ring substituted compounds from which moiety IV can be derived include: 2-methylterephthalic acid, 2,5-dimethylterephthalic acid, 2-methoxyterephthalic acid, 2-phenylterephthalic acid, 2,6-dimethylterephthalic acid, 2-chloroterephthalic acid, 2,6-dichloroterephthalic acid, etc. In a preferred embodiment moiety IV is free of ring substitution and is derived from terephthalic acid.

Moiety IV is present in the polyester of the present invention in a concentration of approximately 7.5 to 27.5 mole percent, and preferably in a concentration of approximately 10 to 20 mole percent.

Other ester-forming moieties (e.g., dioxy units, dicarboxy units and/or other combined oxy and carboxy units) than those specified for moieties I, II, III and IV additionally can be included in the polyester of the present invention in a minor concentration. Representative additional ester-forming moieties can be derived from hydroquinone, isophthalic acid, m-hydroxybenzoic acid, cycloaliphatic dicarboxylic acids, 2,7-dihydroxynaphthalene, dihydroxybenzophenone, dicarboxybenzophenone, hydroxycarboxybenzophenone, etc. Amide-forming moieties also may be included in the polyester of the present invention in a minor concentration. Representative reactants which may form such amide-forming moieties include m-aminophenol, p-aminophenol, m-aminobenzoic acid, p-aminobenzoic acid, m-phenylenediamine, p-phenylenediamine, etc. The additional ester-forming moieties and/or amide-forming moieties optionally may be included in the polyester of the present invention so long as such moieties do not raise the melting temperature of the resulting polymer above that specified, or do not otherwise interfere with the exhibition of the desired anisotropic properties in the melt. The total minor concentration of such additional ester-forming and amide-forming moieties (if present) generally will be less than 10 mole percent of the total polymer.

A preferred polyester in accordance with the present invention which is particularly suited for fiber formation consists essentially of 5 mole percent of 6-oxy-2-naphthoyl units, 67.5 mole percent of 4-oxybenzoyl units, 13.75 mole percent of 2,6-dioxynaphthalene units, and 13.75 mole percent of terephthaloyl units. A preferred polyester in accordance with the present invention which is particularly suited for molded article formation consists essentially of 5 mole percent of 6-oxy-2-naphthoyl units, 70 mole percent of 4-oxybenzoyl units, 12.5 mole percent of 2,6-dioxynaphthalene units, and 12.5 mole percent of terephthaloyl units.

The polyester of the present invention is preferably "wholly aromatic' in the sense that each moiety present contributes at least on aromatic ring to the main polymer chain.

The polyester of the present invention commonly exhibits

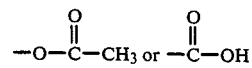

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

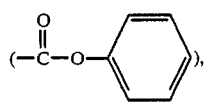

and methylester

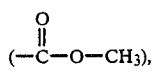

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly is not susceptible to solution processing. It can be readily processed by common melt-processing techniques as discussed hereafter. Most compositions are soluble in pentafluorophenol to a limited degree.

The polyester of the present invention commonly exhibits a weight average molecular weight of about 2,000 to 200,000, and preferably about 10,000 to 50,000 (e.g., about 20,000 to 25,000). Such molecular weight may be determined by standard techniques not involving the solutioning of the polymer (e.g., by end group determination via infra red spectroscopy on compression molded films). Alternatively, light scattering techniques in a pentafluorophenol solution may be employed to determine the molecular weight.

The polyester prior to heat treatment additionally commonly exhibits an inherent viscosity (i.e., I.V.) of at least 3.0 dl./g., and preferably at least 4.0 dl./g. when dissolved in a concentration of 0.1 percent by weight in equal parts by volume of pentafluorophenol and hexafluoroisopropanol at 25° C. In a particularly preferred embodiment the polyester of the present invention exhibits an inherent viscosity in the range of approximately 3 to 7 dl./g. when dissolved in a concentration of 0.1 percent by weight in equal parts by volume of pentafluorophenol and hexafluoroisopropanol at 25° C.

The polyester of the present invention prior to heat treatment preferably also exhibits a melt viscosity in the range of approximately 200 to 1000 poise at 340° C. and a shear rate of 1000 sec.$^{-1}$. Such determination conveniently may be carried out using a commercially available Instron Rheometer having die which measures 4 inches $\times$ 0.03 inch. In contrast thereto the polyester of U.S. Pat. No. 4,184,996 commonly exhibits a melt viscosity of about 2000 to 3000 poise under the same conditions. Such reduced melt viscosity which is exhibited by the polyester of the present invention greatly facilitates melt processing with ease.

The subject polyester of the present invention readily forms liquid crystals in the melt phase and accordingly exhibits a high tendency for the polymer chains to orient in the shear direction. Such anisotropic properties are manifest at a temperature which is readily amenable for melt processing to form shaped articles using standard equipment. Such order in the melt may be confirmed by conventional polarized light techniques whereby crossed polarizers are utilized. More specifically, the anisotropic melt phase may conveniently be confirmed by the use of a Leitz polarizing microscope at a magnification of 40$\times$ with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow); however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They may be heated initially to form a largely melt solution of the reactants wherein some reactants such as terephthalic acid initially are present to some degree as solids. Low levels of terephthalic acid may dissolve under such circumstances. The polymer product sometimes is suspended therein as solid polymer particles. A vacuum may be applied to facilitate removal of volatiles formed during the final stage of the condensation (e.g., acetic acid or water) and to otherwise expedite the polymerization.

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, and III are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I, II, and III are provided. Accordingly, particularly preferred reactants for the condensation reaction are 6-acetoxy-2-naphthoic acid, 4-acetoxybenzoic acid, and 2,6-diacetoxynaphthalene. Such acetylation of at least some of the monomers optionally can be carried out in the reactor prior to the polymerization reaction through the addition of acetic anhydride as described in commonly assigned U.S. Pat. No. 4,429,105 to Charbonneau.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., BF$_3$), hydrogen halides (e.g., HCl), etc. Particularly good catalysts are sodium acetate and potassium acetate. The quantity of catalyst utilized typically is about 0.001 to 1 percent by weight based upon the total monomer weight, and most commonly about 0.005 to 0.050 percent by weight.

The polyester of the present invention readily can be melt processed with ease in the substantial absence of polymer degradation to form a variety of shaped articles (e.g., molded three-dimensional articles, fibers, films, tapes, etc.). The polyester of the present invention is suited for molding applications and may be molded via standard injection molding techniques commonly utilized when forming molded articles. Unlike the polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent by weight of a solid filler (e.g., talc) and/or reinforcing agent (e.g., glass fibers).

The polyester of the present invention also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 70 mils (e.g., 5 to 40 mils) may be utilized. Yarns of about 20 to 200 continuous filaments can be formed. The melt-spinnable polyester is supplied to the extrusion orifice at a temperature above its melting point (e.g., at a temperature of about 300° to 370° C.), and at a temperature of about 345° to 360° C. in a preferred embodiment.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier filament of about 1 to 10 (e.g., 5).

The resulting filamentary material, film, or molded article, optionally may be subjected to a thermal treatment whereby its physical properties are further enhanced. The tenacity of the fiber or film can be significantly increased by such thermal treatment.

More specifically, the fibers or films may be thermally treated in an inert atmosphere (e.g., nitrogen, argon, helium) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 230° C. for 2 hours and at 270° C. for 16 hours. Optimum heat treatment conditions will vary with the specific composition of the polyester and with the fiber's process history.

The fibers, films, and molded articles formed from the polyester of the present invention exhibit an inherent resistance to burning and a good retention of properties at elevated temperatures. For instance, when molded articles formed from the polyester of the present invention are heated from room temperature to 200° C. at a rate of 5° C. in an air atmosphere they commonly retain 50 percent or more of their moduli measured at 200° C. and at room temperature.

The following examples are presented as specific illustrations of the claimed invention. It should be understood, however, that the invention is not limited to the specific details set forth in the examples.

EXAMPLE 1

To a 2 liter glass flask fitted with a stainless steel stirrer, a nitrogen inlet tube, a liquid addition funnel, a Vigreaux column, and a distillation condenser were added the following:

(a) 56.4 grams of 6-hydroxy-2-naphthoic acid (0.3 mole),
(b) 372.6 grams of 4-hydroxybenzoic acid (2.7 mole),
(c) 366 grams of 2,6-diacetoxynaphthalene (1.5 mole),
(d) 249 grams of terephthalic acid (1.5 mole), and
(e) 0.081 gram of potassium acetate catalyst.

It will be noted that the molar ratios of the monomers (a) through (d) were 5/45/25/25.

The flask and its contents were placed in a fluidized sand bath. 316.4 grams of acetic anhydride of 99.1 percent purity were placed in the addition funnel. After the flask and its contents were evacuated to approximately 1 mm. Hg and purged with nitrogen two times, the acetic anhydride was added to the flask, and a continuous nitrogen purge of 30 c.c./minute was admitted to the flask.

The fluidized sand bath was heated under the control of a MicRIcon programmable temperature controller. Initially, the acetic anhydride reacted with reactants (a) and (b) to form 6-acetoxy-2-naphthoic acid and 4-acetoxybenzoic acid. Subsequently, the desired polymerization took place. The contents of the flask were heated with stirring from room temperature to 125° C. over a period of 60 minutes, to 130° C. over a period of 10 minutes, to 140° C. over a period of 40 minutes, to 150° C. over a period of 20 minutes, to 200° C. over a period of 50 minutes, to 21° C. over a period of 5 minutes, to 220° C. over a period of 6.7 minutes, to 335° C. over a period of 115 minutes, to 340° C. over a period of 10 minutes, and held at 340° C. for 10 minutes. The nitrogen purge was terminated. A total of 508 grams of acetic acid were collected during the preceding atmospheric pressure stage of the polymerization. Next, a vacuum was applied to the flask and the pressure was reduced to 10 mm. of Hg in approximately 15 minutes and was maintained at 340° C. while at that reduced pressure level for an additional 1 hour.

The flask was filled with nitrogen, removed from the sand bath, and was immersed in liquid nitrogen to shatter the flask and to free the polymer. The resulting polymer was ground in a Wiley Mill and its inherent viscosity was found to be 4.68 dl./g. when dissolved in a concentration of 0.1 percent by weight in equal parts by volume of pentafluorophenol and hexafluoroisopropanol at 25° C. When the polymer was subjected to differential scanning calorimetry (20° C./min heating rate), it exhibited a melt endotherm at 285° C. The polymer melt was optically anisotropic.

When molten at 360° C. the polymer was extruded through a single hole spinneret (0.005 in. diameter×0.007 in.) at a throughput rate of 0.42 gram/minute. The as-spun filament was quenched in ambient air (i.e., at 72° F. and 65 percent relative humidity) prior to windup at a speed of 800 meters/minute.

A section of the resulting as-spun polyester fiber had a denier of 5 and exhibited the following average single filament properties:

| | |
|---|---|
| Tenacity (grams per denier) | 7.4 |
| Initial modulus (grams per denier) | 581 |
| Elongation (percent) | 1.5 |

Following thermal treatment in a dry nitrogen flow at 230° C. for 2 hours followed by 16 hours at 270° C. the fiber exhibited the following average single filament properties:

| | |
|---|---|
| Tenacity (grams per denier) | 27.4 |
| Initial modulus (grams per denier) | 620 |
| Elongation (percent) | 4.1 |

The physical properties reported herein were determined at 25° C. in accordance with the standard ASTM testing procedure D3822.

EXAMPLES 2 to 11

Example 1 was substantially repeated with the exception that the molar ratios of monomers (a) through (d) were varied as indicated. The melt endotherm of the resulting polymers, the inherent viscosities of the resulting polymers, and the mechanical properties of the 5 denier fibers formed from the same before and after heat treatment are reported in Table I.

It will be noted that the molar ratios of the monomers (a) through (d) were 5/70/12.5/12.5.

After evacuating the autoclave and purging with nitrogen two times, 7,120 grams of acetic anhydride of 99.1 percent purity were pressure transferred under nitrogen into the autoclave.

The temperature of the contents of the autoclave was controlled by a MicRIcon controller while operating in the blended cascade mode and monitored by a Zenith H-89 computer. Initially, the acetic anhydride reacted with reactants (a) and (b) to form 6-acetoxy-2-naphthoic acid and 4-acetoxybenzoic acid. Subsequently, the desired polymerization took place. The contents of the autoclave were heated with stirring while under a nitrogen purge of 4 SCFH to 80° C. over a period of 45 minutes, to 140° C. over a period of 90 minutes, to 200° C. over a period of 60 minutes, to 250° C. over a period of 53 minutes, to 280° C. over a period of 30 minutes, and to 330° C. over a period of 70 minutes where they were held for 30 minutes. The pressure within the autoclave was lowered to 7 mm. of Hg over a 90 minute period and was held at that level for 5 minutes prior to raising to 50 psig with nitrogen. The bottom valve of the autoclave was opened and an ¼ inch strand of polymer was extruded through the same. The molten polymer strand was cooled in a water bath and was cut into 8,700 grams of pellets using a Cumberland strand chopper. The polymer yield was 75 percent since a portion of the polymer adhered to the vessel walls and the agitator.

The resulting polymer exhibited an inherent viscosity of 4.2 dl./g. when dissolved in a concentration of 0.1 percent by weight in equal parts by volume of pentafluorophenol and hexafluoroisopropanol at 25° C. When the polymer was subjected to differential scanning calorimetry (20° C./minute heat rate), it exhibited

TABLE I

| | | | | Fiber Properties | | | | | |
|---|---|---|---|---|---|---|---|---|---|
| | | | | Before Heat Treatment | | | After Heat Treatment | | |
| Example No. | Molar Ratios of Monomers (a) through (d) | Melt Endotherm (°C.) | Inherent Viscosity (dl./g.) | Tenacity (g. per denier) | Elongation (percent) | Modulus (g per denier) | Tenacity (g. per denier) | Elongation (percent) | Modulus (g per denier) |
| 2 | 5/40/27.5/27.5 | 292 | 4.62 | 7.5 | 1.6 | 580 | 26 | 4.1 | 600 |
| 3 | 5/55/20/20 | 280 | 5.23 | 8.4 | 1.7 | 609 | 26.1 | 4.2 | 580 |
| 4 | 5/60/17.5/17.5 | 282 | 5.07 | 8.5 | 1.6 | 578 | 29.3 | 4.3 | 620 |
| 5 | 5/60/17.5/17.5 | 282 | 6.68 | 10.4 | 2.1 | 542 | 21.6 | 4.0 | 540 |
| 6 | 5/65/15/15 | 290 | 5.57 | 8.5 | 1.8 | 529 | 26.8 | 3.9 | 630 |
| 7 | 5/65/15/15.2 | 284 | 3.27 | 5.7 | 1.3 | 512 | 19.8 | 3.6 | 535 |
| 8 | 5/65/15.2/15 | 289 | 5.28 | 7.3 | 1.5 | 546 | 28.2 | 4.0 | 650 |
| 9 | 5/67.5/13.75/13.75 | 292 | 5.42 | 7.6 | 1.6 | 534 | 24.4 | 3.4 | 665 |
| 10 | 5/70/12.5/12.5 | 298 | 5.33 | 7.3 | 1.5 | 555 | 27.8 | 4.1 | 645 |
| 11 | 10/70/10/10 | 278 | 5.76 | 6.8 | 1.6 | 490 | 16.3 | 3.0 | 530 |

EXAMPLE 12

To a 5 gallon stainless steel autoclave equipped with an anchor agitator, a distillation column packed with Raschig rings, a nitrogen inlet port, and acetic anhydride addition port, a thermocouple well, a solids addition port, a bottom discharge valve, and a hot oil jacket were added the following:
(a) 846 grams of 6-hydroxy-2-napthoic acid 4.5 mole),
(b) 8,694 grams of 4-hydroxybenzoic acid (63 mole),
(c) 2,745 grams of 2,6-diacetoxynaphthalene (11.25 mole),
(d) 1,868 grams of terephthalic acid (11.25 mole), and
(e) 1.42 grams of potassium acetate catalyst.

a melt endotherm of 299° C. The polymer melt was optically anisotropic. A melt viscosity of 487 poise at 340° C. and a shear rate of 1000 sec.$_{-1}$ was exhibited using an Instron Rheometer wherein the die measured 4 inches×0.03 inch.

While molten at 360° C. the polymer was melt extruded as described in Example 1 to form a filament.

A section of the resulting as-spun polyester fiber had a denier of 5 and exhibited the following average single filament properties:

| | |
|---|---|
| Tenacity (grams per denier) | 6.8 |
| Initial Modulus (grams per denier) | 556 |
| Elongation (percent) | 1.4 |

Following thermal treatment in a dry nitrogen flow at 230° C. for 2 hours followed by 16 hours at 270° C. the fiber exhibited the following average single filament properties:

| | |
|---|---|
| Tenacity (grams per denier) | 26.4 |
| Initial Modulus (grams per denier) | 674 |
| Elongation (percent) | 3.7 |

EXAMPLES 13 to 19

Example 12 was substantially repeated as reported hereafter with the exception that in Examples 13 to 18 the molar ratios of monomers (a) through (d) were varied. In Example Nos. 13, 14 and 15 the polymerization was terminated at different torque readings on the agitator. Also, the melt viscosity of the polymer at 340° C. and a shear rate of 1000 sec.$_1$ was determined in each instance using an Instron Rheometer wherein the die measured 4 inches×0.03 inch. The values obtained are reported in Table II.

¼ inch strand of polymer was extruded through the same. The molten polymer strand was cooled in a water bath and was cut into 160 pounds of pellets using a Cumberland strand chopper. The polymer yield was 94 percent.

The resulting polymer exhibited an inherent viscosity of 4.3 dl./g. when dissolved in a concentration of 0.1 percent by weight in equal parts by volume of pentafluorophenol and hexafluoroisopropanol at 25° C. A melt viscosity of 635 poise at 340° C. and a shear rate of 1000 sec.$_1$ was exhibited using an Instron Rheometer wherein the die measured 4 inches×0.03 inch. When the polymer was subjected to differential scanning calorimetry (20° C./minute heating rate), it exhibited a melt endotherm of 300° C. The resulting polymer was tray dried at 95° C. in a vacuum oven at 10 mm. of Hg for 16 hours and was repelletized on a 28 mm. Werner-Pfliederer ZSK entruder at a rate of 20 pounds per hour while at 320° C. to produce ⅛ inch pellets having a density of 1.38 g./cc. The pellets were next tray dried again at 120° C. in a forced air oven for 16 hours.

While using an Arburg Model 221E/150 injection

TABLE II

| | | | | | Fiber Properties | | | | | |
|---|---|---|---|---|---|---|---|---|---|---|
| | | | | | Before Heat Treatment | | | After Heat Treatment | | |
| Example No. | Molar Ratios of Monomers (a) through (d) | Melt Endotherm (°C.) | Inherent Viscosity (dl./g.) | Melt Viscosity (poise) | Tenacity (g. per denier) | Elongation (percent) | Modulus (g. per denier) | Tenacity (g. per denier) | Elongation (percent) | Modulus (g. per denier) |
| 13 | 5/67.5/13.75/13.75 | 287 | 3.79 | 177 | 5.8 | 1.2 | 548 | 25.8 | 3.9 | 625 |
| 14 | 5/67.5/13.75/13.75 | 291 | 4.57 | 629 | 6.8 | 1.5 | 529 | 25.8 | 3.9 | 633 |
| 15 | 5/67.5/13.75/13.75 | 295 | 4.95 | 902 | 7.3 | 1.6 | 529 | 27.6 | 3.9 | 666 |
| 16 | 5/67.5/13.75/14 | 295 | 5.22 | 830 | 8.7 | 1.8 | 567 | 25.9 | 3.7 | 657 |
| 17 | 5/70/12.5/13 | 293 | 3.81 | 220 | 6.1 | 1.2 | 557 | 18.1 | 2.9 | 605 |
| 18 | 5/70/13/12.5 | 295 | 3.84 | 329 | 6.2 | 1.4 | 510 | 25.6 | 3.6 | 680 |
| 19 | 5/70/12.5/12.5 | 299 | 4.50 | not available | 5.9 | 1.2 | 545 | 23.7 | 3.5 | 645 |

EXAMPLE 20

Example 12 was substantially repeated on a larger scale wherein a 50 gallon reactor constructed from Hastelloy B alloy was substituted for the 5 gallon stainless steel autoclave. The following were added to the reactor:

(a) 12.4 pounds of 6-hydroxy-2-naphthoic acid (29.9 mole),
(b) 127.8 pounds of 4-hydroxybenzoic acid (420 mole),
(c) 40.4 pounds of 2,6-diacetoxynaphthalene (75.1 mole),
(d) 27.4 pounds of terephthalic acid (74.9 mole), and
(e) 9.44 grams of potassium acetate.

It will be noted that the molar ratios of monomers (a) through (d) were 5/70/12.5/12.5.

After evacuating the reactor twice and purging with nitrogen, 105 pounds of acetic anhydride of 99.1 percent purity were pressure transferred under nitrogen into the reactor.

The contents of the reactor were heated with stirring while under a nitrogen purge of 10 SCFH from room temperature to 80° C. over a period of 45 minutes, to 140° C. over a period of 90 minutes, to 200° C. over a period of 60 minutes, to 235° C. over a period of 35 minutes, to 250° C. over a period of 18 minutes, to 280° C. over a period of 30 minutes, to 310° C. over a period of 30 minutes, to 325° C. over a period of 30 minutes, and to 330° C. over a period of 10 minutes where they were held for 30 minutes. The pressure within the reactor was lowered to 10 mm. of Hg over a 90 minute period and the pressure was raised to 50 psig with nitrogen. The bottom valve of the reactor was opened and a molding machine standard ASTM test bars were formed. During the injection molding procedure, the melt temperature was 305° C., the mold temperatures was 100° C., the hold time was 30 seconds, and the injection time was 10 seconds. For flexural testing the bars measured ⅛ inch×½ inch×5 inches and for flammability testing the bars measured 1/32 inch×½ inch×5 inches. Using the ASTM D648 test procedure and flexural bars it was found that a heat deflection temperature of 250° C. was exhibited at 264 psi. When the other bars were subjected to flammability testing using Underwriters Laboratories procedure UL-94, the bars passed the criteria for a V-O rating.

Additional ASTM flexural and tensile test bars were formed using a Windsor Model HS180 injection molding machine while employing a melt temperature of 305° C., a mold temperature of 100° C., an injection time of 10 seconds, and a hold time of 200 seconds.

When testing the tensile properties of the as formed test bars in accordance with ASTM D638, the modulus was found to be 2,500,000 psi, the strength 20,200 psi, and the elongation 1.0 percent. When testing the flexural properties of the as formed test bars in accordance with ASTM D790, the modulus was found to be 2,100,000 psi and the strength 25,600 psi. In accordance with ASTM D256, the Izod impact strength of the as formed test bars was found to be 3.5 ft.lb./in.

A portion of the polymer was compounded while at 315° to 320° C. with 30 percent by weight based upon the weight of the polymer of chopped E-glass fiber using a 28 mm. ZSK twin screw extruder. Tensile and flexural test bars were formed on the Windsor Model HS180 injection molding machine as previously described. The tensile properties of the as-formed test bars revealed a modulus of 2,400,000 psi, a strength of 22,200 psi and an elongation of 1.7 percent. The flexural properties of the as-formed test bars revealed a modulus of 2,200,000 psi, and a strength of 28,400 psi. The Izod impact strength of the as-formed test bars was found to be 0.95 ft.lb./in.

While molten as described in Example 1, fibers were melt spun using the procedure there described. The average single filament properties for these 5 denier fibers before and after heat treatment are reported in Table III.

EXAMPLES 21 and 22

The polymerization reaction of Example 20 was repeated two additional times. These additional batches are designated Examples 21 and 22. In Example 21, 162 pounds of polymer were recovered which exhibited an inherent viscosity of 4.33 dl./g., a melt endotherm of 301° C., and a melt viscosity of 580 poise in accordance with the test method previously described. The polymer yield for Example 21 was 95 percent. In Example 22, 151 pounds of polymer were recovered which exhibited an inherent viscosity of 5.22 dl./g., a melt endotherm of 296, and a melt viscosity of 624 poise in accordance with the test method previously described. The polymer yield for Example 22 was 89 percent. While molten as described in Example 1, fibers were melt spun using the procedure there described. The average single filament properties for these 5 denier fibers before and after heat treatment are reported in Table III. Accordingly, the polymer yields were excellent, and the resulting fibers following heat treatment exhibited excellent mechanical properties.

280° C. over a period of 60 minutes, to 300° C. over a period of 40 minutes, and to 320° C. over a period of 40 minutes, where it was held for 30 minutes. At this point the nitrogen purge was turned off and the pressure within the reactor was lowered to 350 mm. of Hg. in 15 minutes, to 200 mm of Hg. in 5 minutes, to 75 mm. of Hg. in 5 minutes, to 50 mm. of Hg. in 5 minutes, to 35 mm. Hg. in 5 minutes, and to 20 mm. of Hg. in 10 minutes. When the pressure reached 28 mm. of Hg. the nitrogen purge resumed. The bottom valve of the reactor was opened and a ¼ inch strand of polymer was extruded from the same. The molten polymer strand was cooled in a water bath and was cut into 89 pounds of pellets as described in Example 20. The polymer yield was only 83 percent.

Also, the resulting polymer exhibited an inherent viscosity of only 2.67 dl./g. when dissolved in a concentration of 0.1 percent by weight in equal parts by volume of pentafluorophenol and hexafluoroisopropanol at 25° C.

Attempts to further polymerize the polymer in the melt by passing through a twin-screw extruder at 350° C. and 1 mm. of Hg. pressure from a residence time of 15 minutes raised the inherent viscosity to only 3.6 dl/g.

It was found that a time-consuming solid-state polymerization procedure was required in order to substantially raise the inherent viscosity of the resulting polymer. Also, at a given inherent viscosity value, the melt viscosity of the polymer of U.S. Pat. No. 4,184,996 tends to be substantially greater than the polymer of the present invention. Such increased melt viscosity renders more difficult the melt extrusion of low denier fibers and the molding with precision of articles having thin cross-sections.

Although the invention has been described with pre-

TABLE III

| | Fiber Properties | | | | | |
|---|---|---|---|---|---|---|
| | Before Heat Treatment | | | After Heat Treatment | | |
| Example No. | Tenacity (grams per denier) | Elongation (percent) | Modulus (grams per denier) | Tenacity (grams per denier) | Elongation (percent) | Modulus (grams per denier) |
| 20 | 6.6 | 1.4 | 589 | 30.2 | 4.4 | 645 |
| 21 | 6.7 | 1.4 | 563 | 23.8 | 3.4 | 660 |
| 22 | 8.6 | 1.8 | 579 | 23.4 | 3.6 | 620 |

COMPARATIVE EXAMPLE

This comparative example describes the production of the polymer of U.S. Pat. No. 4,184,996 using substantially the same polymerization procedure as described in Example 20.

To the 50 gallon reactor constructed of Hastelloy B alloy were added the following:
(1) 89.38 pounds of 4-acetoxybenzoic acid (225 mole),
(2) 40.6 pounds of 2,6-diacetoxynaphthalene (75.5 mole),
(3) 27.47 pounds of terephthalic acid (75.1 mole), and
(7.14) 7.14 grams of sodium acetate catalyst.
It will be noted that the molar ratios of monomer (1), (2), and (3) were 60/20/20.

After evacuating the reactor twice to less than 10 mm. of Hg and purging with nitrogen, a stream of nitrogen at 2 SCFH was applied to the reactor.

Hot oil at 225° C. was admitted to the jacket of the reactor and when the contents of the reactor had melted to form a slurry at 195° C. the reaction mixture was heated to 216° C. over a period of 14 minutes, to 226° C. over a period of 10 minutes, to 235° C. over a period of 12 minutes, to 250° C. over a period of 30 minutes, to ferred embodiments, it is to be understood that variations and modifications may be employed without departing from the concept of the invention as defined in the following claims.

We claim:

1. A melt processable polyester capable of forming an anisotropic melt phase at a temperature below approximately 325° C. consisting essentially of the recurring moieties I, II, III, and IV wherein:

I is

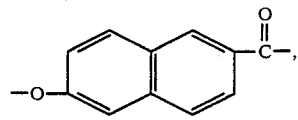

II is

III is

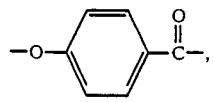

and
IV is

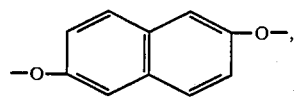

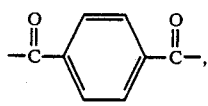

where the aromatic rings of the moieties illustrated optionally may include substitution of at least some of the hydrogen atoms present thereon selected from the group consisting of an alkyl group of 1 to 4 carbon atoms, an alkoxy group of 1 to 4 carbon atoms, halogen, phenyl, and mixtures of the foregoing, and wherein said polyester comprises 3 to 10 mole percent of moiety I, 40 to 75 mole percent of moiety II, 7.5 to 27.5 mole percent of moiety III, and 7.5 to 27.5 mole percent of moiety IV.

2. A melt processable polyester according to claim 1 which is capable of forming an anisotropic melt phase at a temperature below approximately 305° C.

3. A melt processable polyester according to claim 1 which is capable of undergoing melt processing at a temperature in the range of approximately 300° to 370° C.

4. A melt processable polyester according to claim 1 wherein moiety I is present in a concentration of approximately 5 mole percent.

5. A melt processable polyester according to claim 1 which exhibits an inherent viscosity of at least 3.0 dl./g. when dissolved in a concentration of 0.1 percent by weight in equal parts by volume of pentafluorophenol and hexafluoroisopropanol at 25° C.

6. A melt processable polyester according to claim 1 which exhibits an inherent viscosity of at least 4.0 dl./g. when dissolved in a concentration of 0.1 percent by weight in equal parts by volume of pentafluorophenol and hexafluoroisopropanol at 25° C.

7. A melt processable polyester according to claim 1 which exhibits an inherent viscosity in the range of approximately 3 to 7 dl./g. when dissolved in a concentration of 0.1 percent by weight in equal parts by volume of pentafluorophenol and hexafluoroisopropanol at 25° C.

8. A melt processable polyester according to claim 1 which exhibits a melt viscosity in the range of approximately 200 to 1000 poise at 340° C. and a shear rate of 1000 sec.$^{-1}$.

9. A fiber which has been melt spun from the polyester of claim 1.

10. A film which has been melt extruded from the polyester of claim 1.

11. A molded article comprising the melt processable polyester of claim 1.

12. A molding compound comprising the melt processable polyester of claim 1 which incorporates approximately 1 to 60 percent by weight of a solid filler and/or reinforcing agent.

13. A melt processable polyester capable of forming an anisotropic melt phase at a temperature below approximately 35° C. consisting essentially of the recurring moieties I, II, III, and IV wherein:

I is

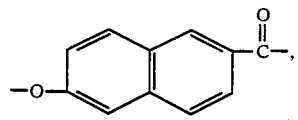

II is

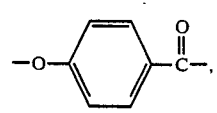

III is

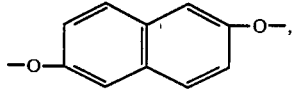

and
IV is

where the aromatic rings of the illustrated moieties are substantially free of ring substitution, and wherein said polyester comprises 3 to 10 mole percent of moiety I, 40 to 75 mole percent of moiety II, 7.5 to 27.5 mole percent of moiety III, and 7.5 to 27.5 mole percent of moiety IV.

14. A melt processable polyester according to claim 13 which is capable of forming an anisotropic melt phase at a temperature below approximately 305° C.

15. A melt processable polyester according to claim 13 which is capable of undergoing melt processing at a temperature in the range of approximately 300° to 370° C.

16. A melt processable polyester according to claim 13 wherein moiety I is present in a concentration of approximately 5 mole percent.

17. A melt processable polyester according to claim 13 which consists essentially of approximately 5 mole percent of moiety I, approximately 67.5 mole percent of moiety II, approximately 13.75 mole percent of moiety III, and approximately 13.75 mole percent of moiety IV.

18. A melt processable polyester according to claim 13 which consists essentially of approximately 5 mole percent of oiety I, approximately 70 mole percent of moiety II, approximately 12.5 mole percent of moiety III, and approximately 12.5 mole percent of moiety IV.

19. A melt processable polyester according to claim 13 which exhibits an inherent viscosity of at least 3.0 dl./g. when dissolved in a concentration of 0.1 percent by weight in equal parts by volume pentafluorophenol and hexafluoroisopropanol at 25° C.

20. A melt processable polyester according to claim 13 which exhibits an inherent viscosity of at least 4.0 dl./g. when dissolved in a concentration of 0.1 percent by weight in equal parts by volume pentafluorophenol and hexafluoroisopropanol at 25° C.

21. A melt processable polyester according to claim 13 which exhibits an inherent viscosity in the range of approximately 3 to 7 dl./g. when dissolved in a concentration of 0.1 percent by weight in equal parts by volume pentafluorophenol and hexafluoroisopropanol at 25° C.

22. A melt processable polyester according to claim 13 which exhibits a melt viscosity in the range of approximately 200 to 1000 poise at 340° C. and a shear rate of 1000 sec.$^{-1}$.

23. A fiber which has been melt spun from the polyester of claim 13.

24. A film which has been melt extruded from the polyester of claim 13.

25. A molded article comprising the melt processable polyester of claim 13.

26. A molding compound comprising the melt processable polyester of claim 13 which incorporates approximately 1 to 60 percent by weight of a solid filler and/or reinforcing agent.

* * * * *

UNITED STATES PATENT AND TRADEMARK OFFICE
CERTIFICATE OF CORRECTION

PATENT NO. : 4,746,694

DATED : May 24, 1988

INVENTOR(S) : Larry F. Charbonneau, Gordon W. Calundann and Brian C. Benicewicz

It is certified that error appears in the above-identified patent and that said Letters Patent is hereby corrected as shown below:

Delete the information following [73] and insert:

Hoechst Celanese Corporation,
Somerville, N.J.

Signed and Sealed this

Eleventh Day of October, 1988

Attest:

DONALD J. QUIGG

Attesting Officer

Commissioner of Patents and Trademarks